Dec. 22, 1925.
G. G. ROSINO
1,566,429
MOTOR OPERATED SPOTLIGHT
Filed May 20, 1924
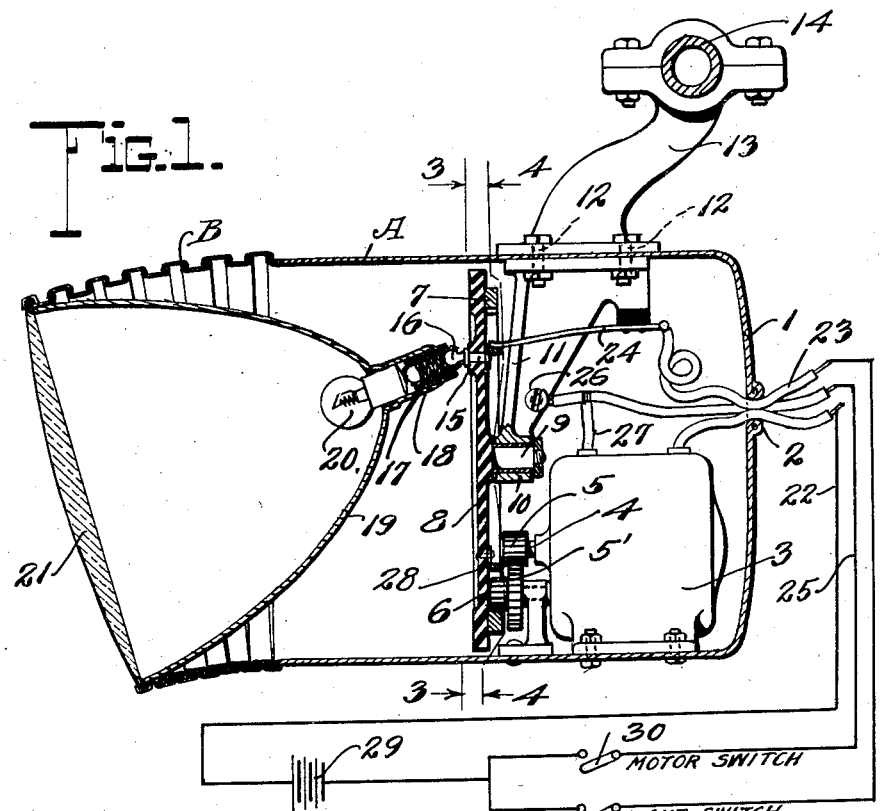
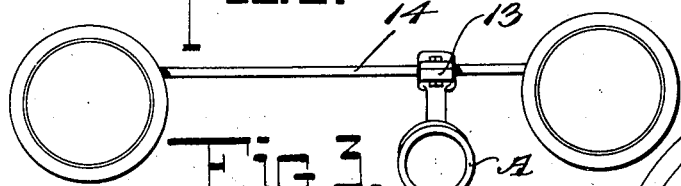
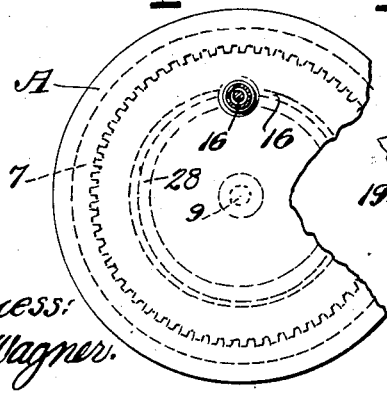
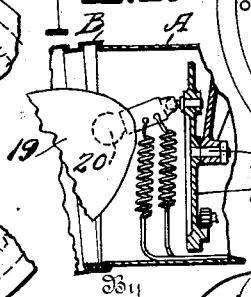
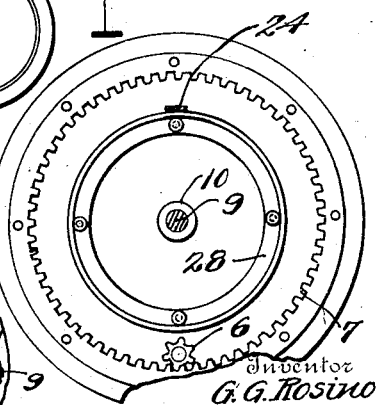
Inventor
G. G. Rosino
By Robb, Robb & Hill
Attorney
Witness:
C. H. Wagner.

Patented Dec. 22, 1925.

1,566,429

UNITED STATES PATENT OFFICE.

GILBERT GEORGE ROSINO, OF SANDUSKY, OHIO.

MOTOR-OPERATED SPOTLIGHT.

Application filed May 20, 1924. Serial No. 714,621.

*To all whom it may concern:*

Be it known that I, GILBERT GEORGE ROSINO, citizen of the United States, residing at Sandusky, in the county of Erie and State of Ohio, have invented certain new and useful Improvements in Motor-Operated Spotlights, of which the following is a specification.

This invention has to do with lighting systems of automobiles and includes primarily a novel type of spot light, the purposes of which light are well known in the art.

The invention involves broadly the employment of a spot light construction wherein the movement of the light is affected by a motor under manual control, irrespective of where the light may be located on the machine.

The present invention furthermore involves broadly the preferred location of the spot light remote from the operator of the machine, as for instance, near one of the front head lights of the machine or automobile, or in substitution for one of said lights, together with control means adjacent to the operator of the machine, preferably at his steering wheel, whereby the motor which moves the spot light may be put into action or stopped at will, the stopping of course being effected when the spot light has been applied to the point or place to be illuminated.

In the carrying out of my invention I utilize a special form of lamp body containing the spot light bulb, reflector and lens, the said parts being adapted to be turned in a definite orbit in relation to a fixed center, in such a manner as to give the desired range of shifting of the light. To the above end in view of the movability of the parts just mentioned, I utilize a lamp or light casing which involves a very peculiar flexible covering section for the enclosed parts which section protects the interior parts against dust, water and other foreign elements.

In the accompanying drawings:

Figure 1 is a sectional view of a spot light embodying the invention, the electric circuit arrangements being conventional and diagrammatically illustrated.

Figure 2 shows a preferred method of arranging the spot light upon the cross-bar which connects the head light of the automobile.

Figures 3 and 4 are cross-sectional views through the lamp or light body taken about on the lines 3—3 and 4—4 of Figure 1.

Figure 5 is a diagrammatic fragmentary view showing a modified arrangement of wiring leading to the electric bulb, which construction is self-explanatory.

Nothwithstanding that I utilize a motor operating mechanism for my spot light, the construction of the device is relatively quite simple. I employ the customarily required lamp casing or body A, the back one of which has an opening 2 for the entrance of electric wire connections. Within the casing A I mount a small motor 3 the operating shaft 4 of which is connected by reduction gears 5, 5' and 6 with a gear ring 7 attached to the rear side of a rotating plate or wheel 8. The wheel or plate 8 may be of solid disk-like form or of spider construction, this being immaterial to the invention. The rotating member 8 is an operating member for the spot light and is provided with a stub axis 9 journaled in a bearing 10 of a depending bearing bracket 11 attached to the top of the casing A by suitable fastenings 12. The same fastenings 12, or other fastenings, may be utilized to secure to the casing A a supporting bracket 13 by which the light or lamp may be attached to the cross-bar 14 which is now usually provided between the head lights of an automobile, see Figure 2. It is notable, however, that I do not confine myself to any particular location of this spot light which I have devised, because it may be arranged at any place desired on an automobile that affords convenient location for attachment purposes.

I do prefer, however, to locate my spot light near the front of the machine because in such position it offers little or no possibility of throwing blinding rays toward oncoming machines, when properly adjusted under practical conditions of use.

Carried by the rotary operating member 8 in an eccentric position in relation to its axis 9 is a pin 15 having a ball-head 16, the latter receiving by a socket element 17 which is a part of a bulb socket 18 at the base of the reflector 19 of my spot light. The bulb 20 is a common type of bulb in use known as a single contact bulb included in an electric circuit one side of which is grounded from the bulb through the frame of the machine in a well known manner. The outer end of the reflector 19 carries the usual lens 21 and is connected with the casing A by means of a flexible casing section B. The casing section B is made of coiled elements after the manner of construction of coiled metal tubing such as used today largely to carry electric current wires, or gas connections, and the like, and as this tubing is well known in the commercial art it will not be further described. It suffices to say that the flexible casing section B permits of a lengthening of the casing of the lamp at one side and shortening at the other side as required during the rotative shifting of the base of the reflector 19 with the bulb 20, under the action of rotation of the operating member 8.

Obviously, as the motor 3 is caused to operate the gearing intermediate it and the member 8 will effect rotation of the latter and this imparts to the ball-head or connecting member 16 a movement in a defined circular path. This way the reflector 19, bulb 20 and parts 17 and 18 are given a circular movement in a prescribed path. It only remains, in accordance with the invention, to provide electric connections to supply current to the bulb 20, with control means to cut off said current at will, and with control means to start and stop the motor 3.

Any suitable electrical connections for the above purpose, with conventional controls, may be utilized. In the present instance I employ a lead wire 22 leading to the motor, a lead wire 23 leading to the brush 24 and a return lead wire 25 which is grounded to the frame of the casing A at 26. One side of the motor is grounded likewise by the wire 27 so that I have an arrangement using one wire to the light 20 and one to the motor. The spring brush 24 cooperates with a collector ring 28 secured to and insulated from the said operating member or disk 8.

In the circuit wire connections which of course may lead to the battery 29 as the source of the electric current motor 3, I interpose the motor switch 30 and the electric light switch 31. The light switch 31 may be applied to the dash-board or steering wheel of the car carrying my spot light and the switch 30 is preferably applied to the steering wheel so that the driver of the vehicle can immediately start and stop the motor 3 according to the exigencies of the situation in which he is using the light 20.

The operation of the invention will be readily discerned from the foregoing presentation of its construction and the action of the various parts and it will be seen that my motor operated light affords a nicety of control of considerable advantage in practice no matter how remotely located the light is from the operator or driver of the machine.

Having thus described my invention what I claim as new and desire to secure by Letters Patent, is:

1. In a spot light, in combination, a casing, a light comprising a reflector, a flexible casing element connecting the reflector at one end with said casing, and means connected with the opposite end of the reflector for swinging the latter in a rotary path for varying the direction of light projection by the reflector.

2. In a spot light, in combination, a casing, a reflector having one end partially entering said casing, means connected with said end of the reflector for turning the same in a circular path of movement for varying the direction of light projection by the reflector, and means supporting the opposite end of the reflector and permitting of said movement.

3. In a spot light, in combination, a casing, a reflector having one end partially entering said casing, means connected with said end of the reflector for turning the same in a circular path of movement for varying the direction of light projection by the reflector, and means supporting the opposite end of the reflector and permitting of said movement, and including a flexible casing element partially enclosing the reflector and flexibly connecting its said other end with the casing substantially as described.

4. In a spot light, in combination, a casing, a parabolic reflector having the base thereof partially entering said casing, means for moving said base portion of the reflector to shift its direction of light projection, a flexible casing element for housing and connection with the end of the reflector opposite said base, and partially enclosing said reflector, with means for uniting said casing element to the reflector and to the first mentioned casing.

5. In a spot light, in combination, a reflector, means connected with one end of said reflector for turning the same in a circular path, and a flexible element connected with the other end of the reflector to house it while it is being turned in such circular path at the opposite end.

6. A spot light comprising a casing, light projecting means in said casing including a reflector, means for shifting the light projecting means, and a flexible casing element cooperating with the casing to enclose and support the light projecting means and having connection with said reflector to permit it to move.

7. A spot light comprising a casing, light projecting means in said casing including a reflector, means for shifting the light projecting means, and a flexible casing element cooperating with the casing to enclose the light projecting means and having connection with said reflector to permit it to move, the flexible casing element comprising a spirally wound tubular construction protecting the parts within the casing and casing element against dust, water or foreign matter.

8. A spot light comprising a casing, light projecting means in said casing including a reflector, means for shifting the light projecting means, and a flexible casing element cooperating with the casing to enclose the light projecting means and having connection with said reflector to permit it to move, the means for shifting the light projecting means comprising a motor, and means for starting and stopping the motor at will.

9. A spot light comprising a casing, light projecting means in said casing including a reflector, means for shifting the light projecting means, and a flexible casing element cooperating with the casing to enclose the light projecting means and having connection with said reflector to permit it to move, the means for shifting the light projecting means comprising a motor, and means for starting and stopping the motor at will, and means supporting the motor within the said casing together with means for supporting the starting and stopping means of the motor at a point remote from the casing.

10. In a spot light, in combination, a case comprising at one end a flexible casing element, light projecting means in the casing comprising a reflector connected at its outer end with said flexible casing element, an operating member rotatable in the casing, an axis supporting said member and located about opposite the axial center of the reflector, a connection between said operating member and the reflector located eccentric of said axis, means for turning said operating member, and means for starting and stopping said turning movement at will.

11. In a spot light, in combination, a case comprising at one end a flexible casing element, light projecting means in the casing comprising a reflector connected at its outer end with said flexible casing element, an operating member rotatable in the casing, an axis supporting said member, a connection between said operating member and the reflector located eccentric of said axis, means for turning said operating member, and means for starting and stopping said turning movement at will, comprising a switch, and a motor controlled by said switch and geared to the operating member to actuate it.

In testimony whereof I affix my signature.

GILBERT GEORGE ROSINO.